3,232,884
BATHS FOR PHOTOGRAVURE PROCESS
Emile Lemaire, 50 Quai St. Leonard, and Roger Lemaire, 24 Rue Morinval, both of Liege, Belgium
No Drawing. Filed May 31, 1961, Ser. No. 113,621
1 Claim. (Cl. 252—79.4)

This application is a continuation-in-part application of Serial No. 51,274, filed August 23, 1960, now abandoned.

The present invention relates to improved baths and processes for etching metals intended for use in the production of photoengraving blocks.

Modern baths and processes for producing gravure or engraving plates by photographic process are disclosed in Patents 2,640,763–7, 2,763,536 and 2,846,295. Particularly desirable baths and processes are disclosed in applicants' co-pending application No. 100,008, filed April 3, 1961, now abandoned. Etching baths for engraving plates are aqueous solutions containing nitric acid as the active etching agent and specific organic compounds which function to produce films on the lateral surfaces which are to be protected from attack by the etching solution. The film-producing agents generally include a hydrocarbon solvent and an oxygenated (ionic) hydrocarbon compound. The etching baths also contain small amounts of various other additives, particularly emulsion forming agents to control the bath properties.

It is an object of this invention to provide improved baths and processes for preparing etching baths. It is also an object of this invention to provide improved compositions of matter from which etching baths for producing engraving plates may be prepared.

We discovered that etching baths are improved and particularly the speed of etching increased by incorporating in said baths between .5 g./l. and 30 g./l. of a phosphate, or an amino-carboxylic acid. The improved baths prepared utilizing these new materials may be made up from liquid compositions of matter containing between 3.5% and 36% of the phosphate or of the amino-carboxylic acid.

The phosphates have the general formula $$(RO)_aP(O)(OH)_{3-a}$$

wherein $a$ is 1–3, and R is an aliphatic (up to 18 carbon atoms in each chain) and/or aryl group, including methyl, ethyl, butyl, octyl, lauryl, oleyl, myristyl, stearyl, phenyl, cresyl, tolyl, and xylyl. The phosphates are prepared from long-chain alcohols and such phenols as resorcinol, pyrogallol, cresol, and guaiacol. Illustrative phosphates include, monomethylphosphate, diethyl phosphate, triphenyl phosphate, diphenyl phosphate, monocresyl phosphate, butyldiphenyl phosphate, di(octylphenyl) phosphate, tri(nonylphenyl) phosphate, lauryl diphenyl phosphate, etc. The triphosphates, such as trilauryl phosphate, triphenyl phosphate and tricresyl phosphate are preferred.

The amino-carboxylic acids are those having the general formula 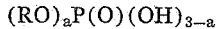 $(HOOCR)_2N—(CH_2)_x—N—(RCOOH)_2$, wherein $x$ is 1–4, and R is a group selected from $CH_2$, $C_2H_4$, $C_3H_6$, $C_4H_8$, and $C_5H_{10}$. The R groups in the same compound may be the same or different. They may be prepared by reacting mixed halogenated acids with a polyamine, such as ethylene diamine, propylene diamine, or butylene diamine. The ethylene diamine-carboxy acids are preferred.

Preferred baths utilizing phosphates or amino-carboxylic acids are those of the type disclosed in our aforementioned co-pending application No. 100,008, now abandoned; the disclosure of which is hereby incorporated herein. These baths contain (1) between 30 g./l. and 300 g./l. of nitric acid; (2) between 5 g./l. and 50 g./l. of film producing agents, said film producing agents comprising between 4 g./l. and 35 g./l. of hydrocarbon solvents of which between 1 g./l. and 15 g./l. is an alkylbenzene such as dodecylbenzene, and between 1 g./l. and 15 g./l. of oxygenated hydrocarbon compounds which includes between 0.5 g./l. and 10 g./l. of an unsaturated acid having between 8 and 24 carbon atoms; and (3) between 1 g./l. and 40 g./l. of emulsion control agents comprising between 1 g./l. and 30 g./l. of non-ionic polymerized ricinoleic acid and between 0.01 g./l. and 5 g./l. of an alkylphenol condensed with between 4 and 6 moles of ethylene oxide. The phosphate or the amino-carboxylic acid is preferably added to this bath in amounts between 5 g./l. and 12 g./l. When used in this manner it markedly increases the speed of the etching bath.

The phosphates and the amino-carboxylic acids tend to control the emulsion. They may be used to replace part of the emulsion control agents already in the bath. When used in this manner, a larger quantity of the phosphate or amino-carboxylic acid should be used, up to 30 g./l.; the total concentration being dependent upon the amount of the emulsion control agent being replaced.

The phosphates and the amino-carboxylic acids improve the performance and particularly the etching speed of aqueous nitric acid baths containing the film producing agents and emulsion control agents. Additional illustrative baths are those containing (1) a saturated acid; and/or (2) an ester such as the ester of an aliphatic acid and a mono- or polyhydric alcohol, or an ester of sulfosuccinic acid such as the sodium salt of dioctyl sulfosuccinate; and/or (3) those containing various sulphated or sulphonated hydrocarbons.

Aqueous nitric acid baths may be made up by adding the various bath components separately. To minimize measurement errors and for better control, it is preferred to premix the various organic components of the bath to form a liquid concentrate which is then added to the bath for make-up and replenishment purposes. Concentration of acid and the preferred concentration of the bath components is dependent upon the type of etching machine as well as the type of photoengraving plates to be etched. Preferred baths have been specified hereinbefore. Preferred compositions consist of between 30% and 72% (percent by volume) of hydrocarbon solvents, of which preferably at least 15% to 30% is an alkylaryl compound; between 3% and 18% of at least one unsaturated acid; between 7% and 36% of polymerized ricinoleic acid, and between 0.1% and 2% of polyethenoxy ether of an alkylphenol; and between 3.5% and 36% of at least one of the phosphates or amino-carboxylic acids. Film forming agents should not be more than 75% of the total mixture. The mixtures may also contain between 1% and 5% of an ester of an organic acid and between 1% and 5% of a lower alkyl ether of ethylene glycol or of propylene glycol. The amino-carboxylic acid and the mono- and di-organo phosphates, i.e. those having a replaceable hydrogen atom, may be added in the form of their salts, such as the sodium salt.

For the purpose of giving those skilled in the art a better understanding of our invention, the following illustrative examples are given: Aqueous nitric acid etching baths were prepared by dispersing the mixtures of organic compounds of Examples 1 and 2, in the proportion of 1%–5% by volume, in an aqueous solution containing between 3% and 30% by weight of nitric acid.

*Example 1*

| | Parts |
|---|---|
| (a) Alkylphenol condensed with 8 moles of ethylene oxide | [1] 5–8 |
| (b) Butylpropylene glycol | 4–8 |
| (c) Dodecylbenzene | 20–40 |
| (d) Phosphoric ester of lauryl alcohol (lauryl) phosphate) | 2–20 |
| (e) Dehydrated ricinoleic acid | 7–13 |
| (f) Polymerized ricinoleic acid | 14–27 |
| (g) Petroleum solvent (boiling point between 130° and 180°) | 30–60 |

[1] By volume.

*Example 2*

| | Percent |
|---|---|
| (a) Dehydrated ricinoleic acid | [1] 7 to 18 |
| (b) Lauryl phosphate | 1 to 5 |
| (c) Butylethylene glycol | 1 to 5 |
| (d) Nonylphenol condensed with 8 moles of ethylene oxide | 0.1 to 2 |
| (e) Dodecylbenzene | 15 to 30 |
| (f) Aliphatic petroleum solvent | 30 to 60 |
| (g) Polymerized ricinoleic acid | 14 to 36 |

[1] By volume.

Further examples of baths for photoengraving according to the invention follow:

*Example 3*

An aqueous bath containing 100 g./l. nitric acid, 12 g./l. of an aliphatic petroleum solvent, 5 g./l. of dodecylbenzene, 5 g./l. of dehydrated ricinoleic acid, 12 g./l. of polymerized acid, and 12 g./l. of triphenyl phosphate. The same bath with butylenediamine tetracaproic acid instead of the phosphate.

*Example 4*

An aqueous bath containing 75 g./l. nitric acid, 8 g./l. of an aromatic petroleum hydrocarbon solvent, 3 g./l. of dodecylbenzene, 3 g./l. of linoleic acid, 1 g./l. of butylricinoleate, 5 g./l. of octylphenol condensed with about 8 moles of ethylene oxide, 1 g./l. of diethylethylene glycol, and 10 g./l. of dioctyl phosphate. The same bath with 10 g./l. of ethylenediamine tetrapropionic acid instead of the phosphate.

*Example 5*

An aqueous bath containing 125 g./l. of nitric acid, 20 g./l. of commercial heptane, 5 g./l. of dehydrated ricinoleic acid, 1 g./l. of butylricinoleate, 15 g./l. of polymerized recinoleic acid, 0.8 g./l. of nonoylphenol condensed with an average of 8 moles of ethylene oxide, and 6 g./l. of butyldi(octylphenyl) phosphate. The same bath with 1 g./l. of ethylenediamine tetracetic acid instead of the phosphate.

*Example 6*

An aqueous bath containing 100 g./l. of nitric acid, 12 g./l. of a petroleum hydrocarbon solvent, 5 g./l. of dehydrated ricinoleic acid, 5 g./l. of dodecylbenzene, 1 g./l. of butylricinoleate, 10 g./l. of polymerized ricinoleic acid, 1 g./l. of an octyl phenol condensed with an average of 8 moles of ethylene oxide, 1 g./l. of butylpropylene glycol, and 8 g./l. of tricresyl phosphate. The same bath with 8 g./l. of ethylenediamine tetraacetic acid instead of the phosphate.

*Example 7*

An aqueous bath containing 200 g./l. of nitric acid, 30 g./l. of an aliphatic petroleum solvent, 10 g./l. of the sodium salt of dioctyl sulfosuccinic acid, and 23 g./l. of monotolyl phosphate. The same bath with 25 g./l. of ethylenediamine tetraacetic acid instead of the phosphate.

*Example 8*

An aqueous bath containing 180 g./l. of nitric acid, 25 g./l. of adipic acid, and 15 g./l. of trioleyl phosphate. The same bath with 20 g./l. ethylenediaminetetraacetic acid instead of the phosphate.

*Example 9*

An aqueous bath containing 120 g./l. of nitric acid, 7 g./l. of dodecylbenzene, 9 g./l. of aliphatic petroleum solvent, 5 g./l. of dehydrated ricinoleic acid, 10 g./l. of polymerized ricinoleic acid, 0.7 g./l. of butylethylene glycol, 0.7 g./l. of a nonylphenol condensed with about 8 moles of ethylene oxide, and 5 g./l. of ethyldi(nonylphenyl) phosphate. The same bath utilizing 4 g./l. of ethylenediaminetetraacetic acid instead of the phosphate.

The addition of a phosphate or of an amino-carboxylic acid to nitric acid etching baths of the type disclosed increases the speed of etching. The additional cost is small compared with the savings achieved by decreasing the time each plate must remain in the etching machine. The baths are not harmed by our additives.

As many embodiments of this invention may be made without departing from the spirit and scope thereof, it is to be understood that the invention includes all such modifications and variations as come within the scope of the appended claim.

What is claimed is:

In an aqueous acid bath containing from 30 to 300 g./l. of nitric acid, from 4 to 35 g./l. of liquid hydrocarbon solvents including from 1 to 15 g./l. of dodecyl benzene, and from 5 to 10 g./l. of an unsaturated acid having from 8 to 24 carbon atoms, for etching photoengraving plates, the improvement comprising the presence in said bath of between 0.5 g./l. and 30 g./l. of at least one compound selected from the group consisting of (A) phosphates having the formula $$(RO)_aP(O)(OH)_{3-a}$$

wherein $a$ is 1 to 3 and R is selected from the group consisting of aliphatic radicals having up to 18 carbon atoms in the chain, phenyl, cresyl, tolyl and xylyl radicals, and (B) acids having the formula $$(HOOCR)_2N(CH_2)_xN(RCOOH)_2$$

wherein $x$ is from 1 to 4, and R is selected from the group consisting of $CH_2$, $C_2H_4$, $C_3H_6$, $C_4H_8$, and $C_5H_{10}$.

References Cited by the Examiner

UNITED STATES PATENTS

| | | | |
|---|---|---|---|
| 1,613,366 | 1/1927 | Van Schaack | 260—410.9 |
| 1,869,312 | 7/1932 | Granger | 252—89 |
| 2,330,181 | 9/1943 | Schwarcman | 260—407 |
| 2,340,745 | 2/1944 | Hanford et al. | 260—410.9 |
| 2,341,239 | 2/1944 | Percy et al. | 260—407 |
| 2,640,763 | 6/1953 | Easley et al. | 252—79.4 XR |
| 2,678,329 | 5/1956 | Gramrath et al | 252—89 |
| 2,846,295 | 8/1958 | Patterson et al. | 252—79.4 |
| 2,940,836 | 6/1960 | Fishaber | 252—79.4 XR |
| 2,942,956 | 6/1960 | Kelly | 252—79.4 XR |
| 2,979,387 | 4/1961 | Easley et al. | 252—79.4 XR |
| 3,004,879 | 10/1961 | Whitby | 252—79.4 |

OTHER REFERENCES

"Emulsion & Detergents," Union Carbide and Carbon Corp., Ninth Ed., pp. 75 and 76.

"The Tetrines," Glyco Products Co. Inc., September 1953, pp. 12 and 13.

JULIUS GREENWALD, *Primary Examiner.*

JOSEPH R. LIEBERMAN, *Examiner.*